United States Patent [19]

Marandi

[11] Patent Number: 4,994,831
[45] Date of Patent: Feb. 19, 1991

[54] FLOATING IMAGE CAMERA

[75] Inventor: Ehsan S. Marandi, Chattanooga, Tenn.

[73] Assignee: Beattie Systems, Inc., Cleveland, Tenn.

[21] Appl. No.: 448,702

[22] Filed: Dec. 11, 1989

[51] Int. Cl.$^5$ .............................................. G03B 17/24
[52] U.S. Cl. .................................... 354/109; 354/110; 354/150
[58] Field of Search ............... 354/120, 121, 122, 123, 354/124, 125, 110, 105–109, 115, 117, 150, 161, 200; 355/40, 43; 352/127, 47, 48

[56] References Cited

U.S. PATENT DOCUMENTS

| 3,395,629 | 8/1968 | Salvesen | 354/109 |
| 3,537,771 | 11/1970 | Trufanoff | 350/452 |
| 3,610,120 | 10/1971 | Morse et al. | 352/47 |
| 3,628,430 | 12/1971 | Morse | 354/109 |

Primary Examiner—L. T. Hix
Assistant Examiner—Khanh Dang
Attorney, Agent, or Firm—Alan Ruderman

[57] ABSTRACT

A camera for providing a composite image on a photographic film of a data card and a person associated with the data so that an identification card having both images thereon may be formed with no clear boundary existing between the two images. The data is focused by a first lens and directed onto a focusing screen, while the person to be photographed is focused by a second lens and directed onto the focusing screen, the image formed on the focusing screen being a composite real image of the two images and is focused by a third lens onto the film when the shutter between the film and the third lens is opened. The first and second lenses direct the respective image through respective vignetters onto the focusing screen by means of a beam splitter which transmits a portion of each image and reflects a portion of each image. The first and second lens are offset from each other, the first lens focusing the image of the data card inserted into the camera onto the mirror which reflects it to the beam splitter. The focusing screen may have preapplied identification information which would be included on the identification card.

23 Claims, 1 Drawing Sheet

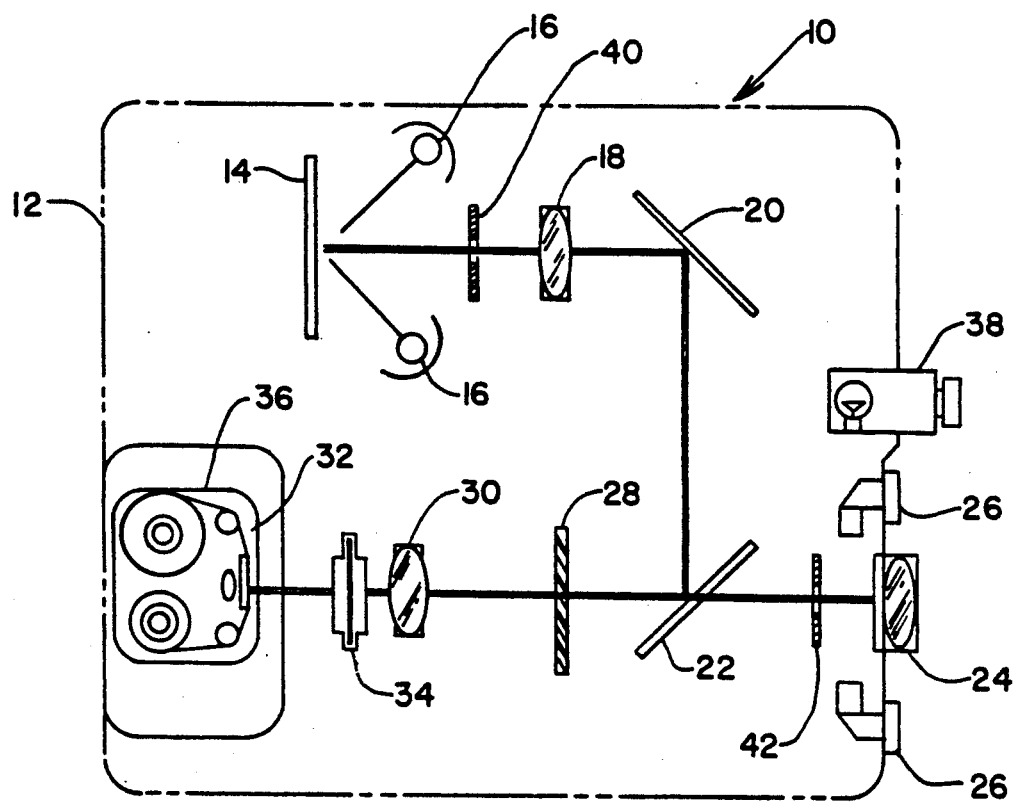

FLOATING IMAGE CAMERA

BACKGROUND OF THE INVENTION

This invention relates to cameras and more particularly to a camera wherein two images are combined on a focusing screen, photographed and captured on film or other photographic medium with no clear boundaries between the two images.

Drivers licenses and similar printed identification cards may comprise a data card having certain information thereon together with a portrait photograph of the licensee or other subject. Such cards originally had the photograph attached to the data card, but now cards of this nature are generally formed by either one of two photographic processes. One of these processes comprises photographing the data card onto a first negative and photographing the subject card onto a second negative, and thereafter overlaying the negatives and printing the combination. Thus, the merging of the data and portrait images occurs not in the camera, but during the printing process and the images are merged onto the print. Therefore, errors may occur at the printing facility, e.g., matching the correct data to the subject. The other process utilizes a camera wherein both the data card and subject are photographed at spaced intervals. One problem with identification cards made by this process is that a clear boundary or area of demarcation exists between the data and the portrait, and thus the cards can be tampered with by carefully cutting out the portrait portion and replacing it with another. Although certain measures are taken to make the card more tamper-proof or more secure, such as having a superimposed seal or words on a plastic protector laminated over the card or within which the card is inserted which may overlap portions of both the data and portrait, a skilled counterfeiter or the like may still readily penetrate the security of the card. For this reason a substantial number of false identification cards presently exist resulting in a substantial number of fraudulent transactions where identification is required.

If no clear boundary existed between the data image and the subject or portrait image, the degree of difficulty required to tamper with such identification cards would be substantially greater, and thus a truer identification card would result. Additional security for such cards would result if another image were also superimposed onto the card, especially one that could identify the camera used to make the card.

SUMMARY OF THE INVENTION

Consequently, it is a primary object of the present invention to provide a camera which can photograph onto a film a data image and a subject image with no clear boundaries between the images, that is, a floating image wherein the subject image is superimposed onto the data image with no clear boundary therebetween.

It is another object of the present invention to provide a camera wherein a data image and a subject image are directed onto and merged together on a real image forming screen and a photograph taken of the merged images on the screen.

It is a further object of the present invention to provide in a camera a focusing screen for receiving and merging two separate real images, the screen being disposed in front of a lens which focuses the merged images onto a film when a shutter therebetween is opened.

It is a still further object of the present invention to provide a camera having a data lens and a subject or portrait lens for directing and merging the separate images onto a focusing screen with the aid of a beam splitter, and focusing the merged images onto a film.

It is a yet still further object of the present invention to provide a method of photographing a data card or the like and a subject such as a person in such a manner that the separate images are merged with no clear boundaries therebetween.

Accordingly, the present invention provides a camera for and a method of forming a floating image on a photographic film, the floating image being defined by two different images merged together so that no clear boundary exists between the two images. More particularly the invention is concerned with the merging together of a data image, such as the information on a data card, hereinafter referred to as the first image, with a subject image, such as the portrait of a person associated with that data, hereinafter referred to as the second image, and the photographing of the merged images in such a manner that the two images cannot be separated. The first and second images are focused onto a real image forming means where they are merged. Although the real image forming means may be at the film plane, it is preferred to utilize a screen such as a focusing screen, and the merged images on the screen are thereafter directed and focused by a lens onto the film at the film plane. In this manner the second image floats on the first image and the borders therebetween are effectively eliminated.

In carrying out the invention the first image is focused by a first lens and directed onto a focusing screen, and the second image is focused by a second lens and directed onto the focusing screen, the image formed on the focusing screen being a real image formed by the first and second images, which is focused by a third lens onto the film when a shutter between the film and the third lens is opened. The means for directing the first and second images onto the focusing screen includes a beam splitter which transmits a portion of each image therethrough while reflecting substantially all of the remaining portion of each image so that a portion of one of the first and second images is reflected by the beam splitter onto the focusing screen while a portion of the other image is transmitted through the beam splitter onto the focusing screen. Thus, all of the elements required for forming the first and second images together with the photographing of the merged images may be mounted within or on the body or housing of a camera, and such a camera may produce a printed identification card such as a drivers license, employee I.D. card or the like which is highly secure or tamper-proof. If desired at least one vignetter may be used to cover portions of the data card and/or the subject's background to eliminate double exposure effects. Additional security may be provided by preapplying an identification element, such as a seal or other information, to the focusing screen, and in fact each screen may include its own particular identification element which would act as a "fingerprint" for the particular camera.

Thus, one aspect of the present invention is the merging and photographing of two separate images onto a film. Another aspect of the invention is the utilization within a camera of a real image forming surface, such as a focusing screen, in the front of a lens which focuses the image on the screen onto the film. A third aspect of the invention is that of directing first and second separate and discrete images onto a focusing screen where the images are merged and may be photographed. And a fourth aspect of the invention is the utilization of a beam splitter within a camera for transmitting and reflecting portions of the incident energy of first and second discrete images so that both images may be directed onto a real image forming screen.

BRIEF DESCRIPTION OF THE DRAWINGS

The particular features and advantages of the invention as well as other objects will become apparent from the following description taken in connection with the accompanying drawing, in which:

The single FIGURE is a diagrammatic view of a camera incorporating structural features in accordance with the principles of the present invention.

DESCRIPTION OF THE PREFERRED EMBODIMENT

Referring now to the drawing, the present invention may be applied to a camera 10 of a type that utilizes a long roll of negative film so that it may be used for photographing a number of subjects, and has fixed, preset or prefocused lenses with no view finder since the camera is anticipated for use at a fixed location spaced a fixed distance, e.g., approximately 42 inches from the subject, however, it should be understood that instant or positive film may be utilized in the camera for those applications where the identification card is to be provided at the time of the sitting and, although not anticipated, if the camera is to be moved or the subject is not to be located at a fixed spacing from the camera, a conventional view finder may be utilized rather than a preset subject lens. The camera 10 comprises a body or housing 12 illustrated in phantom within or on which are mounted the components required for focusing a floating image on the film. The details of the mounting of the various components are not deemed necessary to the disclosure of the present invention since such details are well within the skill of an ordinary person in the camera art, and the specific mounting means are not critical and may be varied according to the desires and criteria of a camera manufacturer.

As illustrated, the camera includes a data card receiving holder 14 for receiving a data card which may be inserted for each subject to be photographed, the date card being illuminated by lighting means 16 such as charged flashes within the camera. The illuminated data card image is received by a data lens 18 fixed within the camera housing, and focused onto a mirror 20 which is fixedly mounted within the camera and disposed at an angle, preferably 45°, to reflect the image onto a plate-type or mirror-type beam splitter 22. The beam splitter 22 is positioned at an angle, also preferably 45°, to receive the reflected image from the mirror 20, and additionally is positioned to receive the image of the subject whose identification is associated with the data card, the image of the subject being focused toward the beam splitter by means of a subject lens 24 mounted on the housing 12 of the camera 10 at a fixed location from the subject to be photographed. Portrait or subject lighting such as flashes 26 preferably are also mounted on the housing adjacent the lens 24.

A beam splitter of the plate or mirror-type is an optical window with a semi-transparent mirrored coating to break a beam into two or more beams. It reflects a portion of the incident energy, absorbs a relatively small portion and transmits the remaining energy. Such beam splitters are manufactured in varying sizes, coatings and percentages of reflectivities and transmissions. For use in the present application, it is preferred that a 50-50 beam splitter be utilized, i.e., 50% of the light beam or image hitting the beam splitter is reflected off its surface while 50% is transmitted through it, the amount of absorption being minimal. One such beam splitter is manufactured and sold by Melles Griot under product No. J31,411. It should be understood, however, that other beam splitters may be utilized such as a 70-30 or a 60-40 splitter and in those cases more lighting may be required for either the image card or the subject depending on the angle that the beam splitter is positioned and, of course, less lighting may be required for the other, if both images are to have the same brightness.

When utilizing a 50-50 beam splitter, as aforesaid, 50% of the data image from the mirror 20 is reflected by the beam splitter 22 and 50% transmitted therethrough, while 50% of the subject image from the lens 24 is reflected by the beam splitter and 50% is transmitted therethrough. The portion of the reflected data image, and the portion of the transmitted subject image are merged together on an image forming screen 28 disposed at the focal plane for receiving the focused images. The remaining incident energy will be absorbed by the interior of the camera housing which, of course, is black. The image forming screen 28 preferably is a focusing screen such as a matte surface coupled with a Fresnel lens, and preferably should be a bright-type of focusing screen such as that disclosed in Smith U.S. Pat. No. 4,558,992 dated Dec. 17, 1985, and assigned to the common assignee as the present invention, such screen forming a real image on a surface coated with a thin layer of optically clear material and having Fresnel rings on the opposite surface. The image forming surface of the screen 28 is disposed opposite to a third lens 30 which focuses the merged images on the focusing screen to the film plane where the film 32 is disposed, the merged images being received by the film when a conventional shutter 34 disposed between the lens 30 and the film 32 is opened.

The film 32 as aforesaid is preferably negative film mounted within a film cassette or magazine 36 which can thereafter be developed and printed to provide an identification card having both the images of the data card and the subject thereon. If desired a positive film may be utilized by use of a positive film holder rather than the magazine. Since both of these images are formed and merged on the screen 28, there is no discernible boundary between the data image and the subject image and thus the subject image is superimposed onto and floats on the data image when the third lens 30 focuses it onto the film 32. The identification card thus is substantially secure since the subject cannot readily be cut out of the card and another substituted. All that a photographer must do is to insert the data card into the holder 14, aim a sighting means such as an aiming light 38 onto a portion, such as the nose, of the subject and activate the shutter 34.

To eliminate double exposure effects so that each separate image formed on the screen 28 appears uncontaminated by the other without visible boundaries between them, such as a "halo" about the subject image, it is preferable to dispose two vignetters in the paths of the respective image before the screen 28. The vignetters are merely black plates with an aperture formed therethrough. Thus, one vignetter 40 may be disposed between the data card 14 and the screen 28 and the other vignetter 42 may be disposed between the subject lens 24 and the beam splitter 22.

Additional security may be provided by preapplying information to the screen 28. For example, a State Seal or company logo may be applied to the screen with transparent color ink or the like and show up on the identification card in color. Alternatively the screen may be etched with such information, but in that instance it will show up as black which may be undesirable.

Accordingly, the present invention provides a camera and a method for producing a floating image effect on a film and thus a printed identification card which has both a data image and a subject image superimposed or merged thereon in such a manner that no clear or discernible boundaries exist between the subject image and the data image. Thus, the degree of difficulty required to tamper with such a printed identification card is far greater than that presently available by utilizing the photographic concepts of the prior art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A camera for photographing a first image and a second image and merging said first and second images together on a photographic film such that no clear boundaries are presented between said first and second images, said camera comprising a real image forming screen, first focusing means including a first lens for focusing a real image of said first image on said screen, second focusing means including a second lens for focusing a real image of said second image on said screen so that said first and second images merge together on said screen to form a composite real image, a shutter intermediate said screen and said first film, and a third lens disposed intermediate said shutter and said screen for focusing said composite real image on said film when said shutter is opened.

2. A camera as recited in claim 1, wherein said screen comprises a Fresnel lens.

3. A camera as recited in claim 1, wherein said first and second focusing means includes a beam splitter disposed intermediate said screen and said first and second lenses for reflecting a portion of said first image to said screen and for transmitting a portion of said second image to said screen, said first and second lenses being offset one from the other.

4. A camera as recited in claim 3, including a mirror disposed intermediate said first lens and said beam splitter for reflecting said first image from said first lens to said beam splitter.

5. A camera as recited in claim 4, wherein said second lens is disposed substantially axially aligned with said third lens, and said first lens is offset relative to said third lens.

6. A camera as recited in claim 5, wherein said screen comprises a Fresnel lens.

7. A camera as recited in claim 3, including a vignetter disposed intermediate said second lens and said screen.

8. A camera as recited in claim 1, wherein said first lens and the subject of said first image are disposed within said camera, and the subject of said second image is disposed outside said camera.

9. A camera as recited in claim 8 including a first vignetter disposed intermediate said first image and said screen, and a second vignetter disposed intermediate said second lens and said screen.

10. A camera as recited in claim 7, wherein the subject of said first image is a data card, and the subject of said second image is a person associated with said card.

11. In a camera having a lens, means for feeding a photographic film, and a shutter disposed intermediate said lens and said film for permitting an image to be formed on said film when said shutter is open, the improvement comprising a focusing screen disposed in front of said lens remote from said shutter for forming a real image at a focal length from said lens that forms said image at the film plane when said shutter is open, and means for forming a real image on said focusing screen for capture on said film when the shutter is open.

12. In a camera as recited in claim 10, including focusing means for directing first and second separate and discreet images onto said screen for merging said images into a composite image.

13. In a camera as recited in claim 12, wherein said focusing means includes a beam splitter for reflecting a portion of the incident energy of said first image onto said screen and for transmitting a portion of the incident energy of said second image onto said screen to form said composite image.

14. In a camera as recited in claim 13, wherein said focusing means further includes two additional lenses, each of said additional lenses disposed for focusing a respective one of said first and second separate and discreet images on said beam splitter.

15. In a camera as recited in claim 14, wherein one of said separate and discreet images is formed from a subject disposed within said camera, and the other of said separate and distinct images is formed form a subject disposed outside said camera.

16. In a camera as recited in claim 15, including a first vignetter disposed intermediate said screen and said subject within said camera, and a second vignetter disposed in said camera intermediate said screen and said subject disposed outside said camera.

17. A method of photographically forming an identification card having a data image thereon together with the image of a person associated with said data superimposed on said card with no clear boundary between the images of said data and said person, said method comprising focusing a real image of said data by a first lens and of said person by a second lens onto a focusing screen to form a composite real image of said data and said person, and focusing said composite image onto a photographic film.

18. In the method as recited in claim 17, wherein said focusing of the images of said data and said person includes transmitting the energy of the images of said data and said person to a beam splitter, and transmitting a portion of the energy received by said beam splitter and reflecting a portion of the energy received by said beam splitter to said focusing screen.

19. In the method as recited in claim 18, wherein said focusing of said image of said data includes transmitting the energy of said data through a first lens to said beam splitter, and said focusing of said image of said person includes transmitting the energy of said person through a second lens to said beam splitter.

20. In the method as recited in claim 19, wherein said first lens is offset from said second lens, and the energy received by said first lens is reflected to said beam splitter.

21. In the method as recited in claim 20, wherein said transmitting of a portion of the energy received by said focusing screen comprises a reflected portion of said image of the data and a transmitted portion of the image of said person.

22. In the method as recited in claim 19, wherein said focusing of said image of said data includes transmitting the energy of said data through a first vignetter, and said focusing of said image of said person includes transmitting the energy of said person through a second vignetter.

23. In the method as recited in claim 19, wherein said focusing said composite image onto a photographic film comprises transmitting the image on said screen through a third lens onto said film.

* * * * *